United States Patent
Blum

(10) Patent No.: US 11,440,457 B1
(45) Date of Patent: Sep. 13, 2022

(54) BOAT LIFT

(71) Applicant: Sherri D. Blum, Carlisle, PA (US)

(72) Inventor: Sherri D. Blum, Carlisle, PA (US)

( * ) Notice: Subject to any disclaimer, the term of this patent is extended or adjusted under 35 U.S.C. 154(b) by 0 days.

(21) Appl. No.: 17/721,506

(22) Filed: Apr. 15, 2022

(51) Int. Cl.
| | |
|---|---|
| *B66F 7/00* | (2006.01) |
| *B60P 3/10* | (2006.01) |
| *B60P 1/44* | (2006.01) |
| *B66F 7/28* | (2006.01) |
| *B66F 3/22* | (2006.01) |
| *B66F 7/06* | (2006.01) |

(52) U.S. Cl.
CPC ........... *B60P 3/1033* (2013.01); *B60P 1/4421* (2013.01); *B66F 3/22* (2013.01); *B66F 7/0666* (2013.01); *B66F 7/28* (2013.01); *B66F 2700/12* (2013.01)

(58) Field of Classification Search
CPC .... B66F 3/22; B66F 7/066; B66F 7/28; B66F 2700/12
See application file for complete search history.

(56) References Cited

U.S. PATENT DOCUMENTS

| | | | | |
|---|---|---|---|---|
| 2,467,657 | A | * | 4/1949 | Brown ....................... B66F 3/12 |
| | | | | 254/122 |
| 3,976,213 | A | | 8/1976 | Ball |
| 4,941,797 | A | * | 7/1990 | Smillie, III ............... B66F 3/12 |
| | | | | 187/269 |
| 4,943,034 | A | * | 7/1990 | Wagnon ..................... B66F 3/44 |
| | | | | 254/122 |
| 5,346,355 | A | | 9/1994 | Riemer |
| 7,111,825 | B2 | * | 9/2006 | Landsberger ............. B01L 9/00 |
| | | | | 254/122 |
| 7,810,788 | B2 | * | 10/2010 | DeVries ................. B65G 15/00 |
| | | | | 254/122 |
| 8,567,763 | B1 | * | 10/2013 | Nolan ...................... B66F 7/28 |
| | | | | 254/122 |
| 10,464,495 | B2 | | 11/2019 | Mercurio |
| 10,800,339 | B2 | | 10/2020 | Anderson |
| 2008/0035688 | A1 | | 2/2008 | Malone |
| 2014/0252056 | A1 | | 9/2014 | Murray et al. |
| 2019/0381944 | A1 | | 12/2019 | Ellenbogen |

OTHER PUBLICATIONS

Malone Foldaway J Folding Kayak Rack, from Dick's Sporting Goods Web Site dated Jan. 2022.

* cited by examiner

*Primary Examiner* — Lee D Wilson
(74) *Attorney, Agent, or Firm* — The Webb Law Firm

(57) ABSTRACT

A lift raises and lowers a boat to load and unload the boat onto a roof of or a roof rack on a vehicle. The lift has an upper frame having a longitudinal axis, a lower frame having a longitudinal axis, and a linkage connecting the upper frame to the lower frame. In a first position the linkage is extended and the lift is raised and in a second position the linkage is retracted and the lift is lowered. At least one lift rack extends from or is part of the upper frame. The lift rack is adapted to support a boat at least vertically such that in the extended linkage first position a boat may be slid in a longitudinal direction between the lift rack and the roof or the roof rack of the vehicle. A method for using the lift is also disclosed.

18 Claims, 8 Drawing Sheets

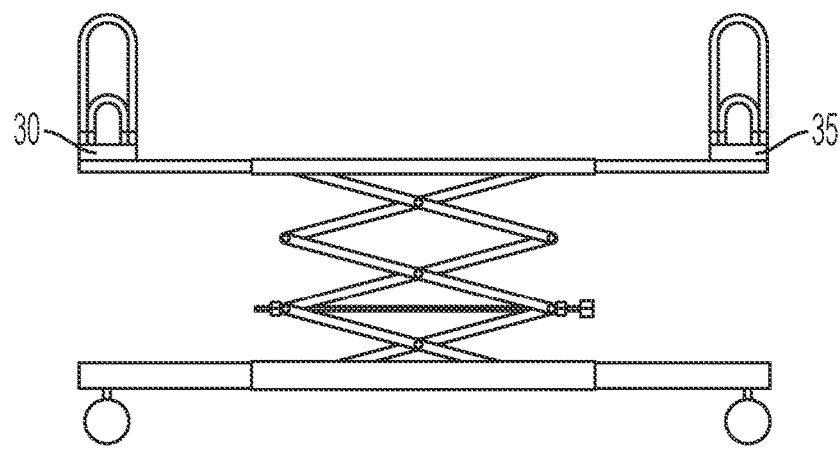
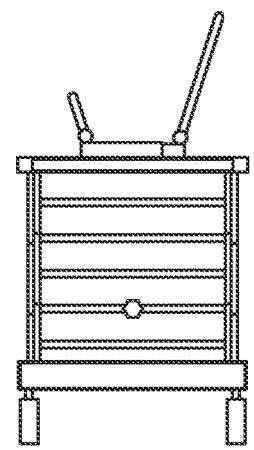
FIG. 7  FIG. 8
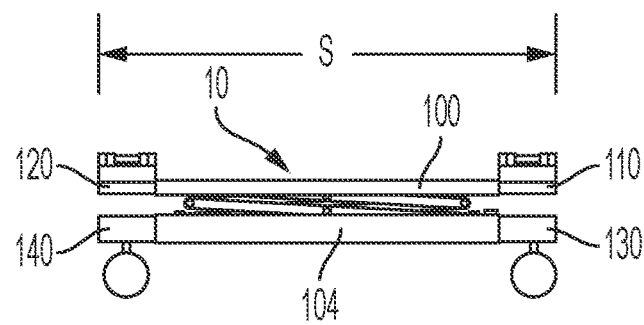
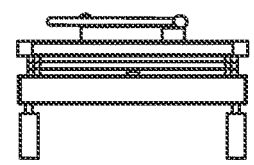
FIG. 9  FIG. 10

BOAT LIFT

BACKGROUND OF THE INVENTION

Field of the Invention

The invention relates to a boat lift and, more particularly, to a boat lift, suitable for use by an individual. The boat lift may be used in an extended position for transferring the boat, such as a kayak or a canoe, to/from the top of a vehicle. In a partially extended position, an individual may manually load/unload the boat onto the lift. The boat may be stored on the lift in this partially extended position or in a retracted position. Finally the lift may be retracted for transporting or compact storage.

Description of Related Art

Typically, transporting small water craft, such as kayaks or canoes, requires them to be mounted on a roof or a roof rack of a vehicle. A small boat, such as a kayak or canoe, may weigh in the range of about 40-70 pounds. While it may be possible for an individual to lift and load such a boat onto a roof or a roof rack of a vehicle, such lifting may be difficult for some individuals and impossible for many. One solution requires two individuals where each individual lifts an end of the boat. However, such an approach may be impossible for a solo boater who wishes to be self-sufficient.

U.S. Pat. No. 5,346,355 entitled "Roof Top Carrier" discloses a rooftop carrier system including a roof top platform 30 permanently attached to the roof 12 of a motor home or recreational vehicle 10. The roof top carrier 20 has a roof top platform 30 and a drop cradle 80. The drop cradle 80 may be lowered to accept luggage and then raised to mount the luggage to the roof top carrier 20. This is a fairly complex system and must be permanently mounted onto the roof of the motor home 10.

United States Patent Application Publication No. 2008/0035688 entitled "Loading System for Vehicle Roofrack" is directed to a loading system 100 mounted to the roof of a vehicle whereby objects, such as a kayak or canoe, may be lifted upon the carrier using mechanical leverage provided by the system. However, once again, the loading system 100 is mounted to the roof or roofrack of the vehicle.

United States Patent Application Publication No. 2019/0381944 entitled "Lift System for Roof-Mounted Storage on Vehicles" is directed to a telescoping lift system attached to a vehicle having a rear-mounted hitch 2 and a roof rack 3. The lift system must be connected directly to the vehicle and, in this case, to the rear-mounted hitch 2.

A lift is needed for lifting boats onto the roof or the roof rack of a vehicle or onto a storage rack whereby the lift is not part of the vehicle and whereby the lift may be easily stored.

SUMMARY OF THE INVENTION

One embodiment of the subject invention is directed to a lift for raising and lowering a boat to load and unload the boat onto a roof of or a roof rack on a vehicle. The lift comprises an upper frame having a longitudinal axis, a lower frame having a longitudinal axis, and a linkage connecting the upper frame to the lower frame. In a first position the linkage is extended and the lift is raised and in a second position the linkage is retracted and the lift is lowered. At least one lift rack extends from or is part of the upper frame. The lift rack is adapted to support a boat at least vertically such that in the linkage first position the boat may be slid in a longitudinal direction between the lift rack and the roof or the roof rack of the vehicle.

A second embodiment is directed to a method for lifting and lowering a boat to load or unload the boat onto or from a roof of or a roof rack of a vehicle using the lift. The method comprises the steps of: 1) with the lift in a partially extended position and the frames in a longitudinally extended position, positioning the boat to rest on the at least one lift rack; 2) extending the lift to the extended position; and 3) sliding the boat in the longitudinal direction from the at least one lift rack to the roof or roof rack of the vehicle.

BRIEF DESCRIPTION OF THE DRAWINGS

FIG. 7 is a side view of the lift in a partially extended position;

FIG. 8 is an end view of FIG. 7;

FIG. 9 is a side view of the lift in the fully retracted position, which is also the retracted storage length;

FIG. 10 is an end view of FIG. 9;

DESCRIPTION OF THE INVENTION

Figure 1:
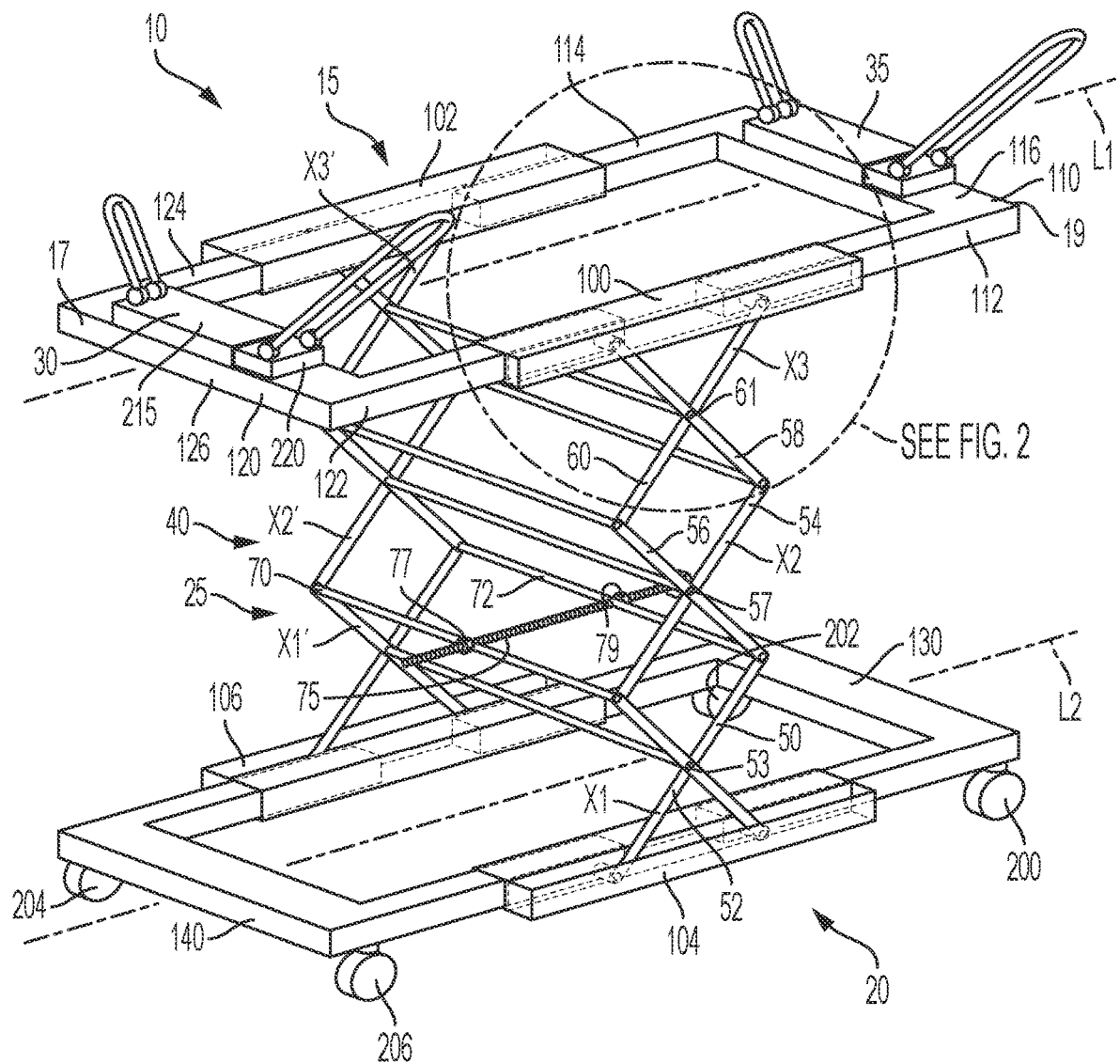
FIG. 1 is a perspective view of the lift in accordance with one embodiment of the subject invention with the lift in the extended position and the upper frame and lower frame in the extended utility length.

FIGS. 1-6 illustrate the lift 10 in an extended position for loading or unloading a boat onto a roof rack or a roof of a vehicle. The lift 10 is comprised of an upper frame 15 having a longitudinal axis L1 and a lower frame 20 having a longitudinal axis L2. A linkage 25 connects the upper frame 15 to the lower frame 20. The linkage 25 is extended to a first position and the lift 10 is raised. In a second position, shown in FIGS. 9-10, the linkage 25 is retracted and the lift 10 is lowered for transporting/storing the lift 10. In a partially extended position, illustrated in FIGS. 7-8, a boat may be loaded onto or unloaded from the lift 10. The boat may be stored in the retracted second position or in a partially extended position.

A first lift rack 30 extends from or may be integral with a first end 17 of the upper frame 15. A second lift rack 35 extends from or may be integral with a second end 19 of the upper frame 15. The lift racks 30, 35 are used to support a boat, such as a kayak or a canoe, at least vertically in a direction perpendicular to the longitudinal axis L1. In such a fashion, with the linkage 25 in the extended position, a boat may be slid in a direction along the longitudinal axis L1 to/from the lift 10 and to/from the roof or the roof rack of a vehicle. As seen from inspection of the lift racks 30, 35, they may also provide lateral support to the boat.

As illustrated in FIG. 1, the linkage 25 may be a scissors arrangement 40 used to extend and lower the lift 10. In particular, the linkage 25 is made up of first pairs of legs 50, 52 pinned to rotate relative to one another about pivot 53 to form a first X shape X1; a second pair of legs 54, 56 which rotate relative to one another about pivot 57 to form a second X shape X2; and a third pair of legs 58, 60 which rotate relative to one another about a pivot 61 to form a third X shape X3. The first X shape X1 is secured at one end to the lower frame 20 and at the other end to one end of the second X shape X2.

As illustrated in FIG. 1, each X shape, X1, X2, X3 configuration has an opposing X shape configuration X1', X2', X3' with similar pairs of legs at the other side of the frame. Each pair of opposing X shaped configurations, such as X1, X1'; X2, X2'; X3, X3', are attached with connecting rods and the opposing configurations extend and retract in unison.

Also, as seen in FIG. 1, the connecting rods 70, 72 common to the legs of the first X shape X1 and the second X shape X2 are further connected by a power screw 75. Each of the connecting rods 70, 72 may have threaded portions 77, 79 which are engaged by the power screw 75, which may be operated by as crank 76, such that rotation of the power screw 75 causes these connecting rods 70, 72 to move closer to one another, thereby raising the lift or, in the alternative, move further apart from one another thereby allowing the lift to lower. It should be appreciated that by rotating the power screw, the lift may be positioned at any height between the extended first position and the retracted second position.

The upper frame 15 has two connecting members 100, 102 while the lower frame 20 also has two connecting members 104, 106. The upper frame 15 has an upper frame first sliding member 110 with a first leg 112 that is longitudinally adjustable within the connecting member 100 and a second leg 114 that is longitudinally adjustable within the connecting member 102. The first leg 112 and the second leg 114 are connected by a cross leg 116. As a result, the upper frame first sliding member 110 is telescopically adjustable with respect to the connecting member 100 and connecting member 102.

The upper frame 15 also has an upper frame second sliding member 120 with a first leg 122, a second leg 124, and a cross leg 126 therebetween. The upper frame second sliding member 120 is also telescopically adjustable within the connecting member 100 and connecting member 102 such that the length of the entire upper frame 15 may be adjusted along the longitudinal axis L1 by both the upper frame first sliding member 110 and the upper frame second sliding member 120.

In the same fashion, the lower frame 20 has a lower frame first sliding member 130 and a lower frame second sliding member 140 slidingly connected to the connecting member 104 and connecting member 106 such that the lower frame 20 telescopes in the same fashion as the upper frame 15 just discussed.

Figure 5:
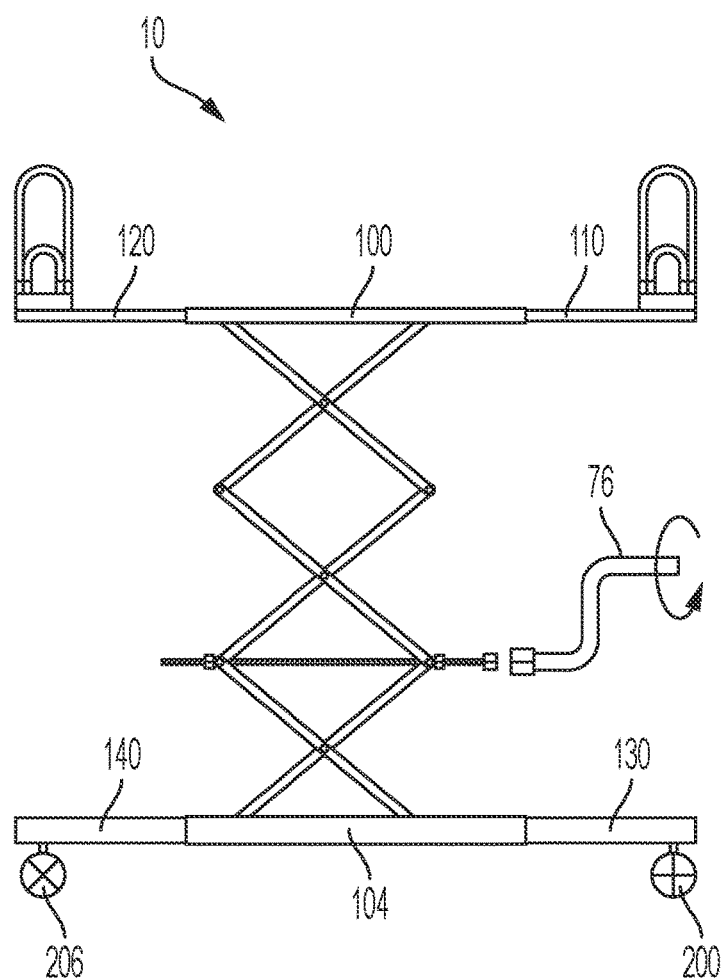
FIG. 5 is a side view of the lift illustrated in FIG. 1.
Figure 6:
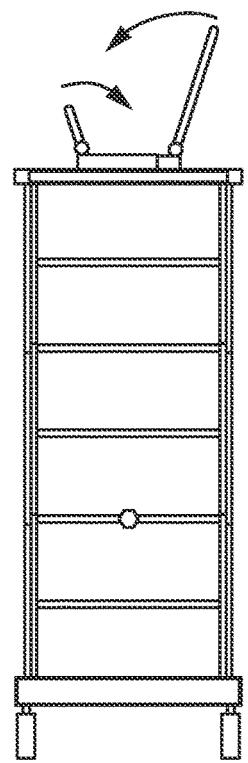
FIG. 6 is an end view of FIG. 5.

Briefly directing attention to FIGS. 5-6, the lift 10 is shown in the extended first position while in FIGS. 9 and 10, the lift 10 is shown in the retracted second position suitable for transporting the lift 10 or storage of the lift 10. The lift 10 in FIGS. 7-8 is shown in a partially extended position suitable for an individual to load onto or unload a boat from the lift 10.

Figure 2:
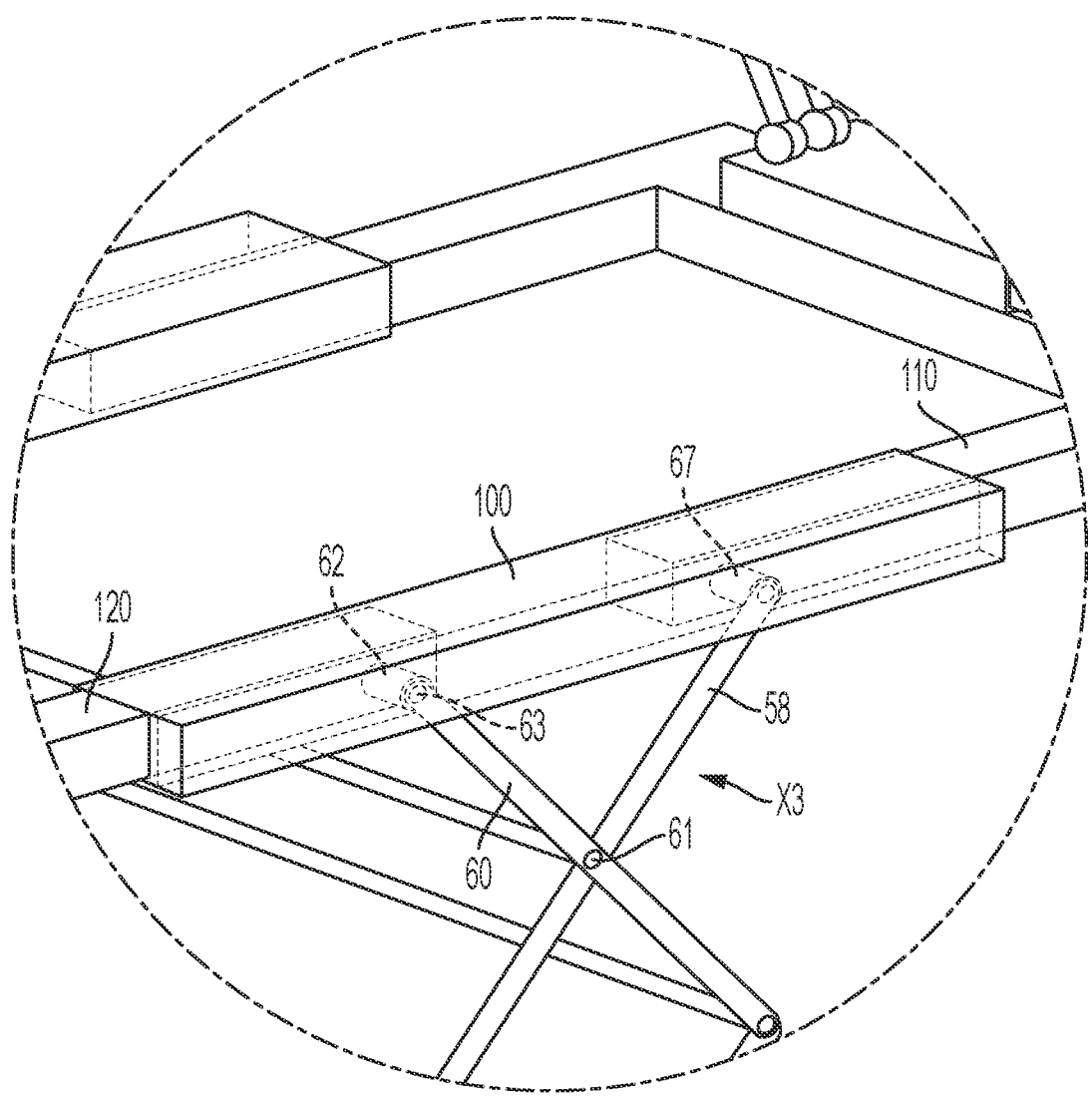
FIG. 2 is an exploded view of the encircled portion of FIG. 1.
Figure 3:
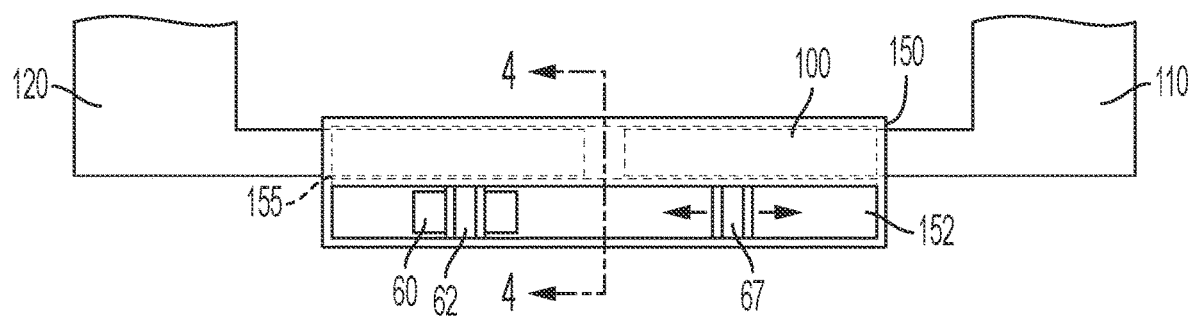
FIG. 3 is a top view of a portion of FIG. 2.
Figure 4:
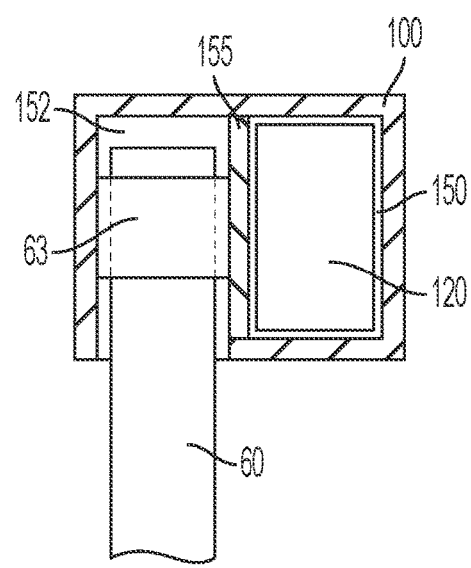
FIG. 4 is a cross-sectional view of the section in FIG. 3 identified with arrows "4-4"

Directing attention to FIGS. 2-4, connecting member 100 may be comprised of a first channel 150 and a second channel 152 with a wall 155 there between. The first channel 150 is associated with the upper frame first sliding member 110 and the upper frame second sliding member 120 such that the sliding members 110 and 120 may longitudinally move within the first channel 150 of the connecting member 100. The upper frame 15 is shown in the extended utility length in FIG. 1 and in the retracted storage length in FIG. 9.

The second channel 152 is associated with the linkage 25 and more particularly with the legs 58, 60 of the third X shape X3 connected to connecting member 100. This will be explained with the understanding that the same relationship applies to the first X shape X1 connected to connecting member 104, opposing third X shape X3' connected to connecting member 102, and opposing first X shape X1' connected to connecting member 106.

Directing attention to FIGS. 2-4, the third X shape X3 is made up of the first leg 58 and the second leg 60. Second leg 60 has a terminal 62 that is secured with a pivot pin 63 within the second channel 152 such that the second leg 60 may pivot about the pin 63 within the second channel 152 but may not move longitudinally within the channel 152. On the other hand, the second leg 60 has a terminal 67 that is permitted to move in the longitudinal direction within the second channel 152 thereby allowing the third X shape X3 to extend and retract.

As a result, the connecting member 100 may serve two functions. The first function is to allow the upper frame first sliding member 110 and upper frame second sliding member 120 to move longitudinally within the connecting member 100. The second function is to secure the third X shape X3 within the second channel 152 so that the third X shape X3 supports the connecting member 100 but is also permitted to extend and retract so that the lift may be raised and lowered.

With respect to FIGS. 9-10, the lift 10 in its retracted second position has a retracted storage length S of approximately 4 feet. To minimize weight, the upper frame 15, lower frame 20, and the linkage 25 may be made of aluminum.

As illustrated in FIG. 1, wheels 200, 202, 204, and 206 are mounted to the lower frame 20 and, as illustrated in FIG. 5 in schematic, using locks 160, 165, may be positioned in a locked position as illustrated by wheel 200 or in an unlocked position as illustrated by wheel 206. Mechanisms for performing such a task are well-known in the art and, therefore, details are not provided herein.

The purpose of locking the wheels is to prevent wheel rotation so that the lift 10 does not move when a boat is loaded or unloaded.

Figure 11:
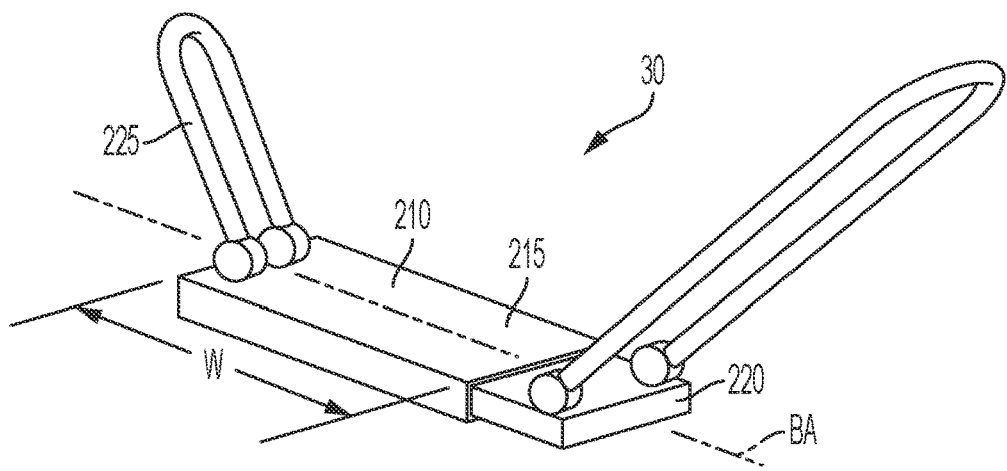
FIG. 11 is a lift rack associated with the lift in a retracted position and with the arms of the lift rack extended.
Figure 12:
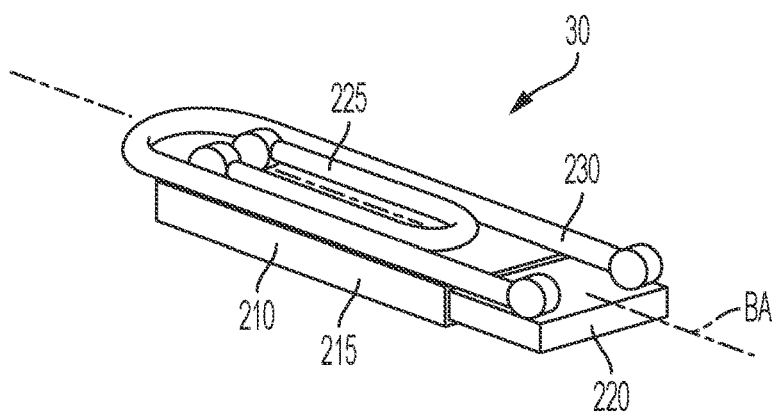
FIG. 12 is the lift rack of FIG. 11 in a retracted position with the arms of the lift rack folded down.
Figure 13:
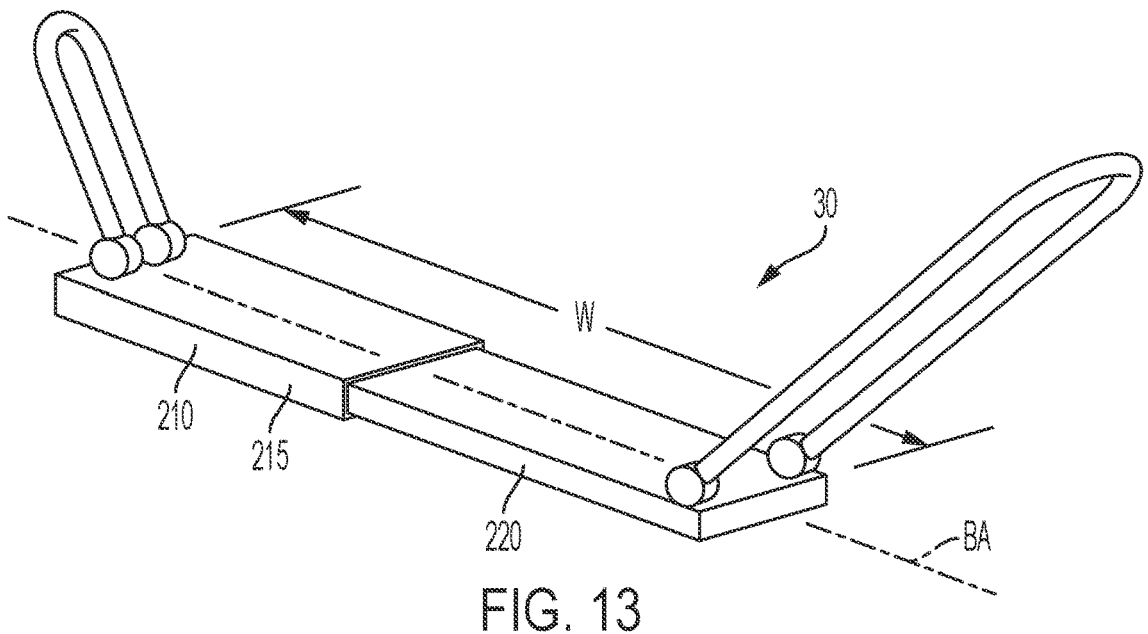
FIG. 13 is the lift rack in an extended position with the arms of the lift rack extended.

FIGS. 11-13 illustrate a first lift rack 30 which, as previously mentioned, extends from or is an integral part of the upper frame 15. The first lift rack 30 is made up of a first base member, or telescopic base member, 215 and a second base member 220 wherein the first base member 215 and the second base member 220 are slidably adjustable relative to one another along a base longitudinal axis BA to adjust the width W, as illustrated in FIGS. 11 and 13. The purpose of this is to allow the first lift rack 30 to accommodate boats of different sizes. For example, the arrangement in FIG. 11 may be set to a width W to accommodate a kayak while the arrangement of FIG. 13 may be adjusted to accommodate the width W of a canoe. As illustrated herein, the first base member 215, which may be of similar shape to but smaller than the second base member 220, has a support member 225 pivotably attached to the first base member 215. A support member 230 is pivotably attached to the second base member 220. Support member 225 and support member 230 may be loop shaped such that a width of support member 225 is less than the width between the two opposing legs of support member 230 thereby enabling support member 225 to be folded down and support member 230 to be folded around support member 225. Together, the support members 225, 230, when folded down, are generally flush. Such an arrangement is also illustrated in FIG. 12 and is suitable for storage.

Briefly returning to FIG. 1, the first base member 215 of the lift rack 30 may be part of the upper frame 15 or may be secured thereto in any number of different ways known to one skilled in the art, including being bolted or welded to the upper frame 15. This same arrangement would apply to the lift rack 35. The position of the lift racks 30, 35 may be offset laterally with respect to the longitudinal axis L1 of the upper frame 15 such that when the second base member 220 is extended, as illustrated in FIG. 15, the larger boat 300 will be approximately centered about the longitudinal axis L1 on the upper frame 15 while when the second member 220 is retracted, as illustrated in FIG. 14, the smaller boat 300 will also be approximately centered about the longitudinal axis L1 of the upper frame 15.

Figure 14:
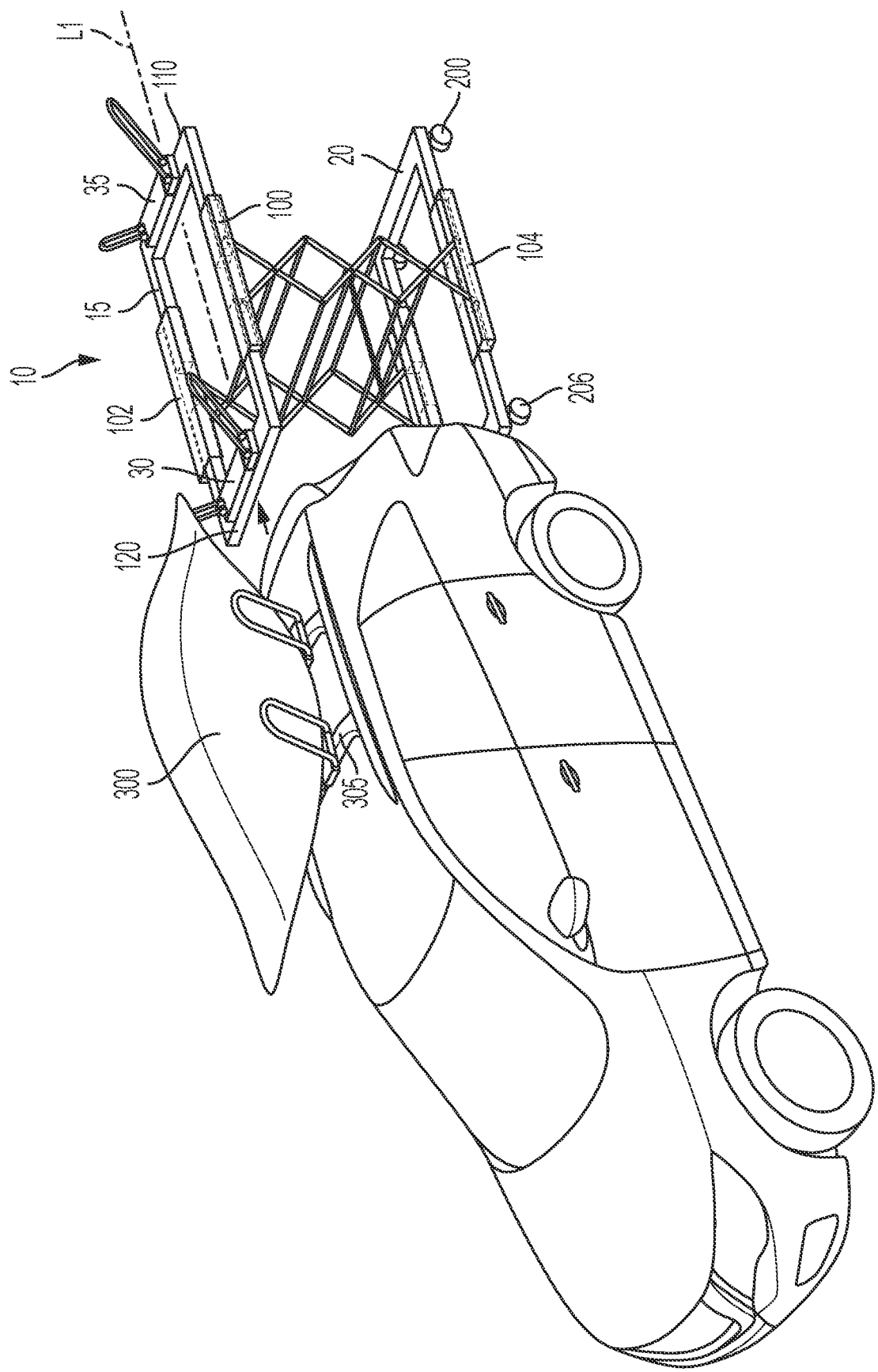
FIG. 14 is a perspective view of the lift proximate to a vehicle illustrating a kayak which may be slid from the lift to a vehicle roof or from the vehicle roof to the lift.

While the lift 10 may be used to both load and unload a boat from the vehicle, FIG. 14 illustrates a configuration whereby lift 10 is positioned to unload a boat, such as a kayak 300, from a roof rack 305 of a vehicle. The kayak 300 is slid along the roof rack 305 along the longitudinal axis L1 of the upper frame 15 of the lift 10 until the kayak 300 is resting upon the lift 10 on the first lift rack 30 and the second lift rack 35. All of wheels of the lift 10 would be locked, although only wheels 200 and 206 are illustrated in FIG. 14. Once the kayak 300 is mounted upon the lift 10, the lift may be lowered, such as that shown in FIGS. 7-8, to a partially extended position at a level preferred by the user for manually lifting the kayak 300 from the lift 10. The kayak 300 may then be used. The same step may be reversed to load the kayak 300 onto the vehicle. For storage, the lift 10 is lowered to the collapsed position and the upper frame first sliding member 110 and upper frame second sliding member 120 are retracted within the connecting members 100, 102 so that the lift resembles the configuration illustrated in FIGS. 9-10. The lift 10 may also remain in the partially extended position illustrated in FIGS. 7-8, or in another position, with the kayak 300 mounted thereupon, for storage. It can be appreciated that the lift 10, with the wheels unlocked, may be easily moved to different locations.

Figure 15:
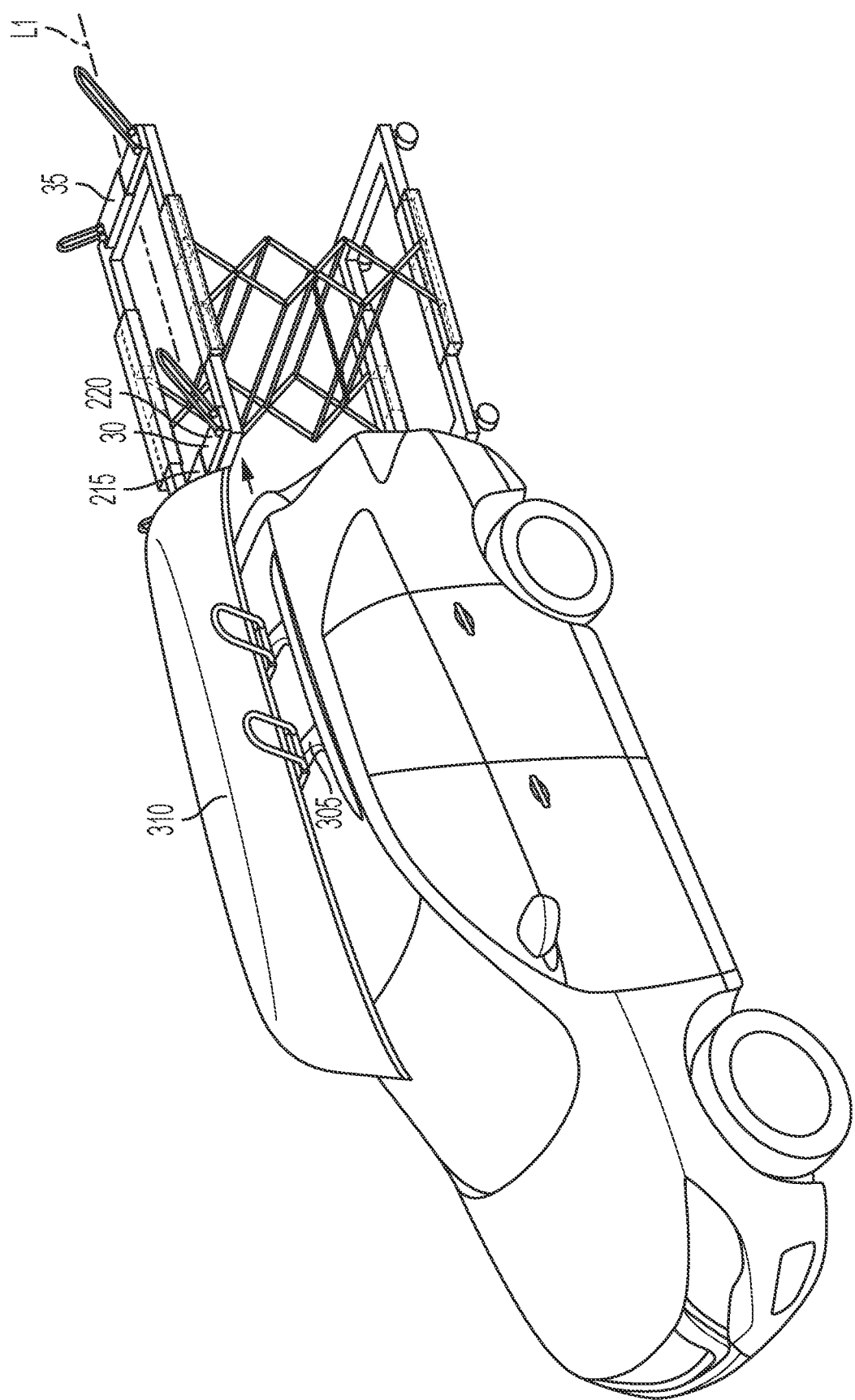
FIG. 15 is a perspective view of a lift proximate to a vehicle illustrating a canoe which may be slid from the lift to a vehicle roof/roof rack or from the vehicle roof/roof rack to the lift.

FIG. 15 illustrates a similar configuration to that shown in FIG. 14. However, the first base member 215 and the second base member 220 of the first lift rack 30 have been expanded so that their width W accommodates the width of the canoe 310. The canoe 310 may be slid from or onto the roof rack 305 in the same fashion as previously described in FIG. 14 with respect to the kayak. However, unlike the arrangement in FIG. 14 to configure the lift 10 to the storage/transport configuration, with the canoe 310 removed from the lift 10, the first base member 215 and the second base member 220 of each lift rack 30, 35 must be retracted as illustrated in FIG. 12 along with moving the upper frame first sliding member 110 and the upper frame second sliding member 120 into connecting members 100, 102. Note that the sliding members of the lower frame 20 must also be retracted within connecting members 104, 106.

The following is one manner by which the lift 10 may be used. With the lift 10 in the retracted second position illustrated in FIGS. 9-10, the power screw 75 is rotated to raise the lift 10 to a partially extended position. Either before or after that step, the upper frame first sliding member 110, and the upper frame second sliding member 120, may be telescoped from the connecting member 100, or the lower frame first sliding member 130, and the lower frame second sliding member 140, may be telescoped from the connecting member 104, as illustrated in FIGS. 7-8. Additionally, as seen in FIG. 11, the support members 225, 230 may be unfolded. Depending upon the width of the boat, the width of the lift racks 30, 35 may need to be adjusted. In particular, the second base member 220 may be extended from the first base member or telescopic base member 215 associated with the first lift rack 30 as shown in FIG. 13. The second lift rack 35 is expanded in a similar fashion. With the lift 10 in the partially extended position (FIGS. 7-8), the boat may be loaded onto the lift racks 30, 35. Thereafter, the power screw 75 is rotated further and the lift 10 is extended to the extended first positon (FIG. 1). At this time, the boat may be slid from the lift rack 30, 35, or generally speaking, from the lift 10, onto the roof or roof racks of a vehicle as shown in FIG. 14 or FIG. 15. If the boat is already on the roof or roof rack of a vehicle, these steps may be performed in reverse to lower the boat from the vehicle.

In the retracted position of FIGS. 9-10, the lift rack 10 may be easily stored or transported, for example, within a vehicle. However, as previously noted, it is also possible to store a boat on the lift rack 10 with the lift rack 10 in, for example, a partially extended position such as that illustrated in FIGS. 7-8. With the wheels unlocked, the lift 10 may be wheeled to a desirable location.

In one embodiment, a method for lifting and lowering a boat to unload the boat onto the roof or roof rack of a vehicle using a lift 10 comprises the step of, with the lift 10 in the partially extended position and the upper frame 15 and lower frame 20 in a longitudinally-extended position, positioning the boat to rest in at least one first lift rack 30 mounted to the upper frame 15. Thereafter, rotating the power screw 75 to raise the lift 10 to the extended position. Then, sliding the boat in the longitudinal direction from the at least one lift rack 30 onto the roof or roof rack of the vehicle. After the step of sliding the boat from the at least one first lift rack 30, retracting the linkage to a retracted position the upper frame 15 and the lower frame 20 into a longitudinally contracted position with the sliding members positioned within the connecting members 100, 102. Furthermore, the first base member, or the telescopic base member, 215 and the second base member 220 for each of the lift racks should be contracted to the storage position.

Although the invention has been described in some detail for the purpose of illustration based on what is currently considered to be the most practical preferred and non-limiting embodiments, examples, or aspects, it is to be understood that such detail is solely for that purpose and that the invention is not limited to the disclosed preferred and non-limiting embodiments, examples, or aspects, but, on the contrary, is intended to cover modifications and equivalent arrangements that are within the spirit and scope of the appended claims. For example, it is to be understood that the present invention contemplates that, to the extent possible, one or more features of any preferred and non-limiting embodiment, example, or aspect can be combined with one or more features of any other preferred and non-limiting embodiment, example, or aspect.

The invention claimed is:

1. A lift for raising and lowering a boat to load and unload the boat onto a roof or a roof rack on a vehicle, wherein the lift comprises:
    an upper frame having a longitudinal axis;
    a lower frame having a longitudinal axis;
    a linkage connecting the upper frame to the lower frame, wherein in a first position the linkage is extended and the lift is raised and in a second position the linkage is retracted and the lift is lowered; and
    at least one lift rack extending from or part of the upper frame, wherein the at least one lift rack is adapted to support a boat such that in the linkage first position the boat may be slid in a longitudinal direction between the lift rack and the roof or the roof rack of the vehicle;
    wherein the upper frame and the lower frame are each telescopically adjustable along each respective longitudinal axis between an extended utility length and a retracted storage length.

2. The lift according to claim 1, wherein the linkage may be partially extended such that the at least one lift rack is approximately 2 feet from the ground such that a boat may be loaded onto or unloaded from the lift.

3. The lift according to claim 1, wherein in the retracted position the lift may be stored or the lift may be transported.

4. The lift according to claim 1, wherein the linkage is a scissors arrangement.

5. The lift according to claim 4, wherein the linkage includes a power screw connected to longitudinally opposing legs which, when the power screw is rotated in one direction extends the linkage and when rotated in the opposite direction retracts the linkage.

6. The lift according to claim 5, wherein the power screw includes a crank, which is used to rotate the power screw.

7. The lift according to claim 4, wherein the linkage has terminals which slide within the upper frame and lower frame.

8. The lift according to claim 1, wherein the at least one lift rack is open in an upward direction.

9. The lift according to claim 1, wherein each of the at least one lift rack has two arms extending from a base.

10. The lift according to claim 9, wherein the two arms of each of the at least one lift rack define a width between the arms and wherein the rack is telescopically adjustable to adjust the width.

11. The lift according to claim 9, wherein arms of the lift rack pivot about the base between an unfolded position and a folded position.

12. The lift according to claim 1, wherein the retracted storage length is approximately 4 feet.

13. The lift according to claim 1, wherein upper frame, lower frame and the linkage are made of aluminum.

14. The lift according to claim 1, wherein wheels are attached to the lower frame to support the lift.

15. The lift according to claim 14, wherein locks are attached to the wheels to prevent wheel rotation.

16. A method for lifting and lowering a boat to unload the boat onto a roof or a roof rack of a vehicle using a lift having:
    an upper frame having a longitudinal axis;
    a lower frame having a longitudinal axis;
    a linkage connecting the upper frame to the lower frame, wherein in a first position the linkage is extended and the lift is raised and in a second position the linkage is retracted and the lift is lowered; and
    at least one lift rack extending from or part of the upper frame, wherein the at least one lift rack is adapted to support a boat such that in the linkage first position the boat may be slid in a longitudinal direction between the lift rack and the roof or the roof rack of the vehicle;
    wherein the upper frame and the lower frame are each telescopically adjustable along each respective longitudinal axis between an extended utility length and a retracted storage length, the method comprising the steps of:
    1) with the lift in a partially extended position and the frames in a longitudinally extended position, positioning the boat to rest on the at least one lift rack;
    2) extending the lift to an extended position;
    3) sliding the boat in a longitudinal direction from the at least one lift rack to the roof or roof rack of the vehicle.

17. The method according to claim 16, further including, after the step of sliding the boat from an at least one lift rack, the step of;
    4) retracting the lift to a retracted position and positioning the frames into a longitudinally retracted position for transporting the lift or storage of the lift.

18. The method according to claim 16 further including, after the step of sliding the boat from an at least one lift rack, the steps of:
    4) with the lift in the extended position, sliding the boat in a longitudinal direction from the roof or roof rack of the vehicle to the at least one lift rack; and
    5) retracting the lift to a position below the extended position for removing the boat from the lift or for storing the boat on the lift.

\* \* \* \* \*